US012388321B2

(12) United States Patent
Schmidt et al.

(10) Patent No.: US 12,388,321 B2
(45) Date of Patent: Aug. 12, 2025

(54) GAS TURBINE ENGINE EQUIPPED WITH A CONTROL SYSTEM FOR MANAGEMENT OF ROTOR MODES USING AN ELECTRIC MACHINE

(71) Applicants: General Electric Company, Schenectady, NY (US); General Electric Deutschland Holding GmbH, Frankfurt (DE)

(72) Inventors: Richard Schmidt, Loveland, OH (US); Darek Tomasz Zatorski, Fort Wright, KY (US); Rangasai Madoor Comandore, Bangalore (IN); Mohamed Osama, Garching (DE)

(73) Assignees: GENERAL ELECTRIC COMPANY, Evendale, OH (US); GENERAL ELECTRIC DEUTSCHLAND HOLDING GMBH, Frankfurt (DE)

( * ) Notice: Subject to any disclaimer, the term of this patent is extended or adjusted under 35 U.S.C. 154(b) by 0 days.

(21) Appl. No.: 17/488,696

(22) Filed: Sep. 29, 2021

(65) Prior Publication Data
US 2023/0291278 A1    Sep. 14, 2023

(30) Foreign Application Priority Data
Mar. 25, 2021 (IN) .............................. 202111013074

(51) Int. Cl.
| | |
|---|---|
| H02K 7/18 | (2006.01) |
| F01D 15/10 | (2006.01) |
| H02P 9/00 | (2006.01) |
| B64D 27/02 | (2006.01) |
| H02P 101/30 | (2015.01) |

(52) U.S. Cl.
CPC ........... *H02K 7/1823* (2013.01); *F01D 15/10* (2013.01); *H02P 9/008* (2013.01); *B64D 27/026* (2024.01); *F05D 2220/76* (2013.01); *F05D 2270/053* (2013.01); *H02P 2101/30* (2015.01)

(58) Field of Classification Search
None
See application file for complete search history.

(56) References Cited

U.S. PATENT DOCUMENTS

| | | |
|---|---|---|
| 2,802,555 A | 8/1957 | Kalikow |
| 3,571,637 A | 3/1971 | Henningsen et al. |
| 4,167,695 A | 9/1979 | Phillips |
| 5,300,848 A | 4/1994 | Huss et al. |

(Continued)

*Primary Examiner* — Gerald L Sung
*Assistant Examiner* — Jacek Lisowski
(74) *Attorney, Agent, or Firm* — Venable LLP; Michele V. Frank

(57) ABSTRACT

A turbomachine is provided. In one aspect, the turbomachine includes a rotating component and an electric machine that includes a stator assembly and a rotor assembly rotatable with the rotating component relative to the stator assembly. Further, the turbomachine includes an actuator coupled with the rotor assembly, the stator assembly, or both for moving the rotor assembly, the stator assembly, or both relative to one another. In addition, the turbomachine includes a controller configured to receive data indicating an operating state of the rotating component and cause the actuator to adjust a position of at least one of the stator assembly and the rotor assembly based at least in part on the operating state of the rotating component.

19 Claims, 9 Drawing Sheets

(56) References Cited

U.S. PATENT DOCUMENTS

| | | | | |
|---|---|---|---|---|
| 5,627,419 A | * | 5/1997 | Miller | H02K 21/027 |
| | | | | 290/38 A |
| 7,042,128 B2 | | 5/2006 | Zepp et al. | |
| 7,253,548 B2 | | 8/2007 | Dooley et al. | |
| 8,183,704 B2 | | 5/2012 | Rivas et al. | |
| 8,354,768 B2 | | 1/2013 | Cipriani | |
| 8,913,344 B1 | * | 12/2014 | Parsoneault | G11B 19/2036 |
| | | | | 360/99.08 |
| 9,714,609 B2 | | 7/2017 | French et al. | |
| 9,973,123 B2 | | 5/2018 | Klodowski | |
| 10,027,267 B2 | | 7/2018 | Vandergrift | |
| 10,132,369 B2 | | 11/2018 | Legros et al. | |
| 10,196,923 B2 | | 2/2019 | Thomassin | |
| 10,355,568 B2 | | 7/2019 | Gieras | |
| 11,296,638 B2 | * | 4/2022 | McDonald | B63H 21/14 |
| 2004/0222713 A1 | * | 11/2004 | Sidey | H02K 1/278 |
| | | | | 310/156.43 |
| 2013/0300124 A1 | * | 11/2013 | Chobot | H02K 21/22 |
| | | | | 290/55 |
| 2014/0297113 A1 | * | 10/2014 | Zuckerman | B60G 11/265 |
| | | | | 701/36 |
| 2016/0222816 A1 | * | 8/2016 | Chen | F02C 9/28 |
| 2016/0365774 A1 | * | 12/2016 | Sautier | F16F 13/264 |
| 2017/0045039 A1 | * | 2/2017 | Laursen | F16C 33/586 |
| 2017/0077780 A1 | * | 3/2017 | Tecza | H02K 5/128 |
| 2017/0302138 A1 | * | 10/2017 | Coldwate | H02K 7/20 |
| 2018/0138761 A1 | * | 5/2018 | Niergarth | H02K 21/025 |
| 2018/0269737 A1 | | 9/2018 | Niergarth et al. | |
| 2019/0097479 A1 | | 3/2019 | Chong et al. | |
| 2019/0128324 A1 | * | 5/2019 | Ciciriello | F02C 6/00 |
| 2019/0140495 A1 | | 5/2019 | Gajanayake | |
| 2019/0301300 A1 | | 10/2019 | Chiasson et al. | |

* cited by examiner

GAS TURBINE ENGINE EQUIPPED WITH A CONTROL SYSTEM FOR MANAGEMENT OF ROTOR MODES USING AN ELECTRIC MACHINE

PRIORITY INFORMATION

The present application claims priority to Indian Patent Application 202111013074 filed on Mar. 25, 2021.

FIELD

The present subject matter relates generally to a gas turbine engine equipped with a control system for managing rotor modes using an electric machine.

BACKGROUND

Typical aircraft propulsion systems include one or more gas turbine engines. For certain propulsion systems, the gas turbine engines generally include a fan and a core arranged in flow communication with one another. Additionally, the engine core of the gas turbine engine general includes, in serial flow order, downstream of the fan, a compressor section, a combustion section, a turbine section, and an exhaust section. The compressor section can include a low pressure compressor and a high pressure compressor downstream of the low pressure compressor. The turbine section can include a high pressure turbine and a low pressure turbine downstream of the high pressure compressor. A high pressure rotor or spool can drivingly connect the high pressure turbine to the high pressure compressor and a low pressure rotor or spool can drivingly connect the low pressure turbine with the low pressure compressor and the fan.

For certain aircraft propulsion systems, and aircraft incorporating such aircraft propulsion systems, it may be beneficial for the propulsion system to include one or more electric machines operatively coupled with the high pressure rotor or the low pressure rotor. Such electric machines can be used to generate electrical power for various accessory systems of the gas turbine engines and/or the aircraft, for example.

In some instances, engines are not able to be designed with rotor vibration modes outside of the engine operating range. Consequently, it becomes necessary to mitigate the resonances through use of damping devices, such as Squeeze Film Dampers (SFD). While such damping devices are generally effective in controlling rotor vibrations, they add weight and complexity to the engine, and in some instances, they impart a penalty on the efficiency of the engine.

Accordingly, a propulsion system for an aircraft having an electric machine capable of addressing one or more of these issues would be useful.

BRIEF DESCRIPTION

Aspects and advantages of the invention will be set forth in part in the following description, or may be obvious from the description, or may be learned through practice of the invention.

In one aspect, a turbomachine is provided. The turbomachine includes a rotating component rotatable about an axis of rotation. The turbomachine also includes an electric machine. The electric machine includes a stator assembly and a rotor assembly rotatable with the rotating component relative to the stator assembly. Further, the turbomachine includes an actuator operatively coupled with at least one of the rotor assembly and the stator assembly for moving the rotor assembly, the stator assembly, or both relative to one another. Further, the turbomachine includes a controller communicatively coupled with the actuator. The controller is configured to: receive data indicating an operating state of the rotating component; and cause the actuator to adjust a position of at least one of the stator assembly and the rotor assembly based at least in part on the operating state of the rotating component.

In another aspect, a method of operating a turbomachine is provided. The method includes receiving data indicating an operating state of a rotating component of the turbomachine. The turbomachine includes an electric machine having a stator assembly and a rotor assembly. The rotor assembly is rotatable and operatively coupled with the rotating component. The method also includes moving a position of at least one of the stator assembly and the rotor assembly based at least in part on the operating state of the rotating component so that an air gap defined between the rotor assembly and the stator assembly is changed.

In a further aspect, a non-transitory computer readable medium is provided. The non-transitory computer readable medium comprising computer-executable instructions, which, when executed by one or more processors of a controller, cause the one or more processors to: receive data indicating an operating state of a rotating component of a turbomachine, the turbomachine including an electric machine having a stator assembly and a rotor assembly, the rotor assembly being rotatable and operatively coupled with the rotating component; generate a control command for an actuator to adjust a position of at least one of the stator assembly and the rotor assembly based at least in part on the operating state of the rotating component; and cause the actuator to adjust the position of at least one of the stator assembly and the rotor assembly based at least in part on the control command.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
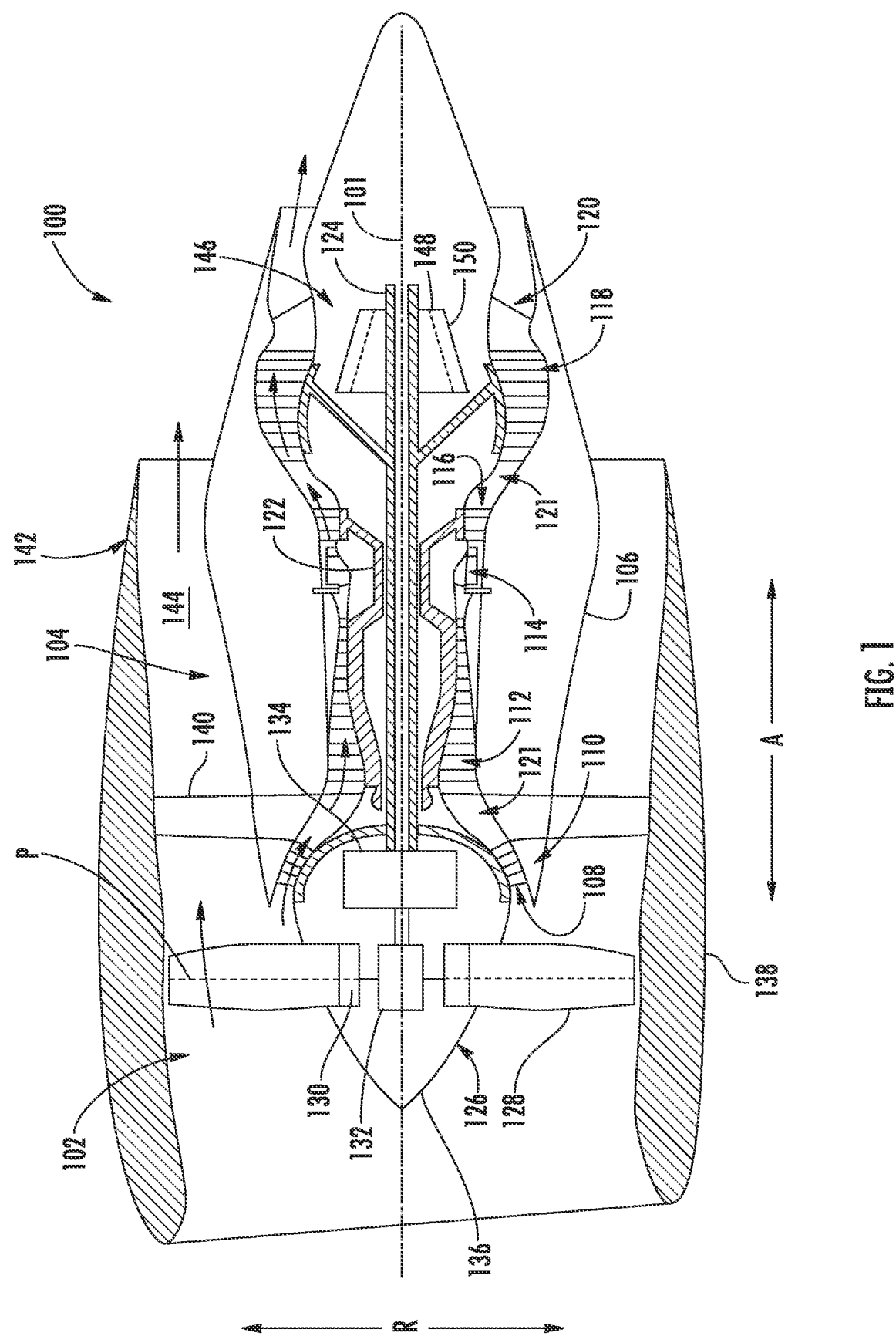
FIG. 1 provides a schematic, cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Aspects of the present disclosure are directed to a turbomachine having an embedded electric machine that can be utilized to control or mitigate the vibration response of a rotating component to which the electric machine is coupled. In one example aspect, a turbomachine includes a rotating component, such as a rotor. The turbomachine also includes an electric machine that includes a stator assembly and a rotor assembly. The rotor assembly is rotatable with the rotating component relative to the stator assembly. Further, the turbomachine includes an actuator coupled with at least one of the rotor assembly and the stator assembly. The actuator can be commanded to move the rotor assembly, the stator assembly, or both relative to one another. As one example, the actuator can move the rotor assembly relative to the stator assembly. As another example, the actuator can move the stator assembly relative to the rotor assembly. In addition, the turbomachine includes a controller. The controller is configured to receive data indicating an operating state of the rotating component. For instance, the controller can receive data indicating a rotational speed of the rotating component. The controller is further configured to cause the actuator to adjust a position of at least one of the stator assembly and the rotor assembly based at least in part on the operating state of the rotating component. By adjusting the position of at least one of the stator assembly and the rotor assembly relative to one another, the air gap defined between the stator assembly and the rotor assembly is changed. Consequently, the stiffness of the electric machine is changed. Advantageously, the change in stiffness of the electric machine can be utilized to mitigate high vibration responses of the rotating component.

Referring now to the drawings, wherein identical numerals indicate the same elements throughout the figures, FIG. 1 provides a schematic cross-sectional view of a propulsion engine in accordance with an exemplary embodiment of the present disclosure. For this embodiment, the propulsion engine is configured as a high-bypass turbofan jet engine 100, herein referred to as "turbofan 100." The turbofan 100 may be incorporated into an aircraft propulsion system, e.g., as an under-wing mounted turbofan engine. Alternatively, in other embodiments, the turbofan 100 may be incorporated into any other suitable aircraft or propulsion system. For reference, the turbofan 100 defines an axial direction A extending parallel to a longitudinal centerline 101, a radial direction R, and a circumferential direction C (FIG. 2) extending about the longitudinal centerline 101.

The turbofan 100 includes a fan section 102 and a core engine 104 disposed downstream of the fan section 102. The core engine 104 includes a substantially tubular outer casing 106 that defines an annular core inlet 108. The outer casing 106 encases, in serial flow relationship, a compressor section including a booster or Low Pressure (LP) compressor 110 and a High Pressure (HP) compressor 112; a combustion section 114; a turbine section including an HP turbine 116 and an LP turbine 118; and a jet exhaust nozzle section 120. The compressor section, combustion section 114, and turbine section together define a core air flowpath 121 extending from the annular core inlet 108 through the LP compressor 110, HP compressor 112, combustion section 114, HP turbine section 116, LP turbine section 118 and jet nozzle exhaust section 120. An HP rotor 122 or spool drivingly connects the HP turbine 116 to the HP compressor 112. An LP rotor 124 or spool drivingly connects the LP turbine 118 to the LP compressor 110.

For the embodiment depicted in FIG. 1, the fan section 102 includes a variable pitch fan 126 having a plurality of fan blades 128 coupled to a disk 130 in a spaced apart manner. The fan blades 128 extend outward from the disk 130 generally along the radial direction R. Each fan blade 128 is rotatable relative to the disk 130 about a pitch axis P by virtue of the fan blades 128 being operatively coupled to a suitable actuation member 132 configured to collectively vary the pitch of the fan blades 128 in unison. The fan blades 128, disk 130, and actuation member 132 are together rotatable about the longitudinal axis 101 by the LP rotor 124 across a power gear box 134. The power gear box 134 includes a plurality of gears for stepping down the rotational speed of the LP rotor 124 to a more efficient rotational fan speed.

The disk 130 is covered by a rotatable spinner or front hub 136 aerodynamically contoured to promote an airflow through the plurality of fan blades 128. Additionally, the fan section 102 includes an annular fan casing or outer nacelle 138 that circumferentially surrounds the fan 126 and/or at least a portion of the core engine 104. The nacelle 138 is supported relative to the core engine 104 by a plurality of circumferentially-spaced outlet guide vanes 140. A downstream section 142 of the nacelle 138 extends over an outer portion of the core engine 104 so as to define a bypass airflow passage 144 therebetween.

Additionally, the turbofan 100 includes an electric machine 146 rotatable with one or more rotatable components of the turbofan 100. Specifically, for this embodiment, the electric machine 146 is rotatable with the low pressure system of the turbofan 100. Specifically, for the embodiment depicted, the electric machine 146 is arranged co-axially with and mounted to the LP rotor 124. As used herein, "co-axially" refers to the axes being aligned. It should be appreciated, however, that in other embodiments, an axis of the electric machine 146 may be offset radially from the axis of the LP rotor 124 and further may be oblique to the axis of the LP rotor 124, such that the electric machine 146 may be positioned at any suitable location at least partially inward of the core air flowpath 121.

The electric machine 146 includes a rotor assembly 148 and a stator assembly 150. For the embodiment depicted, the rotor assembly 148 and stator assembly 150 define a tapered air gap (see FIG. 2) and the rotor assembly 148 is configured to move relative to the stator assembly 150 during certain operations, as will be explained in more detail below.

It should be appreciated that the turbofan engine 100 depicted in FIG. 1 is provided by way of example only and is not intended to be limiting. For instance, in other exemplary embodiments, the turbofan engine 100 may have any other suitable configuration. For example, in other embodiments, the turbofan engine 100 may be configured as a turboprop engine, a turbojet engine, a turboshaft engine, a differently configured turbofan engine, or any other suitable gas turbine engine. Additionally or alternatively, exemplary aspects of the present disclosure (such as the electric machine 146) may be incorporated into or otherwise utilized with any other suitable type of engine, such as an aeroderivative gas turbine engine, a nautical gas turbine engine, a power generation gas turbine engine, an internal combustion engine, etc., or further with any other turbomachine or machine having rotating components.

Figure 2:
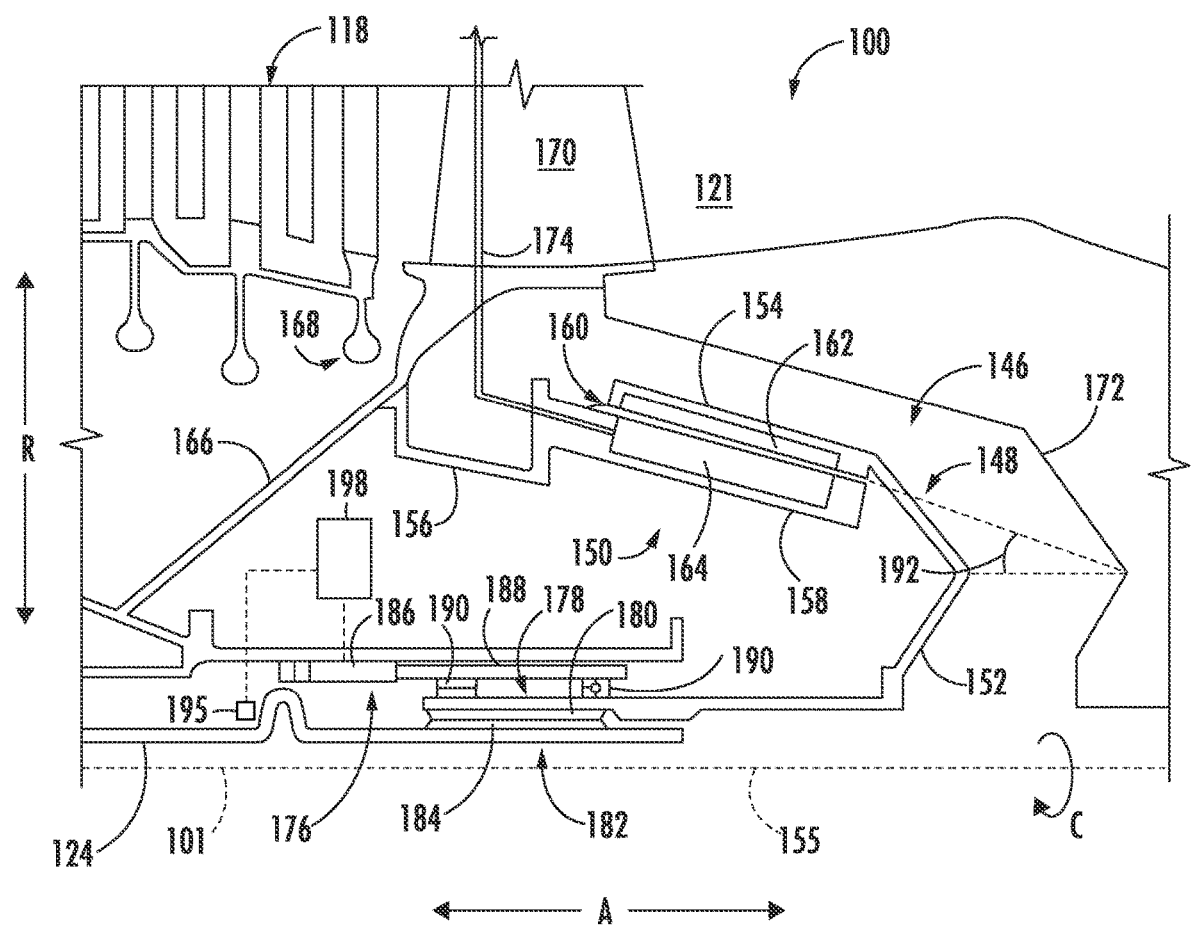
FIG. 2 provides a schematic, cross-sectional view of an electric machine embedded in the gas turbine engine of FIG. 1 and depicts a rotor assembly of the electric machine in a first position.

Referring now to FIG. 2, a close-up schematic view of the electric machine 146 embedded within the turbofan 100 is provided. As shown, the electric machine 146 is embedded within a turbine section of the turbofan 100, and more particularly, the electric machine 146 is operatively coupled with the LP rotor 124. Additionally, the electric machine 146 is positioned at least partially within or aft of the LP turbine 118 of the turbine section along an axial direction A. It will be appreciated that in other exemplary embodiments the electric machine 146 may be positioned at other suitable locations within the turbofan 100.

The electric machine 146 includes a rotor assembly 148 and a stator assembly 150. The electric machine 146 also defines a centerline 155, which is aligned with or coaxial with the longitudinal axis 101 of the turbofan 100 in this example embodiment. The rotor assembly 148 includes a rotor connection member 152 and a rotor 154. The stator assembly 150 similarly includes stator connection member 156 and a stator 158. The rotor 154 of the rotor assembly 148 and stator 158 of the stator assembly 150 together define an air gap 160 therebetween. Moreover, for this embodiment, the rotor 154 includes a plurality of magnets 162, such as a plurality of permanent magnets, and the stator 158 includes a plurality of windings or coils 164. As such, the electric machine 146 may be referred to as a permanent magnet electric machine. However, in other exemplary embodiments, the electric machine 146 may be configured in any suitable manner. For example, the electric machine 146 may be configured as an electromagnetic electric machine, including a plurality of electromagnets and active circuitry, as an induction type electric machine, a switched reluctance type electric machine, a synchronous AC electric machine, an asynchronous electric machine, or as any other suitable electric generator or motor.

As noted above, for this embodiment, the rotor assembly 148 is coupled with or attached to the LP rotor 124. In this manner, the rotor assembly 148 is rotatable with the LP rotor 124. The attachment of the rotor assembly 148 to the LP rotor 124 will be described in more detail below. The stator assembly 150 is coupled with or attached to a structural support assembly 166 of the turbine section. More specifically, the stator connection member 156 extends from the structural support assembly 166 to the stator 158 to support the stator 158. Notably, the structural support assembly 166 is configured as part of an aft frame assembly 168. The aft frame assembly 168 further includes an aft frame strut 170 extending through the core air flowpath 121 of the core engine 104 (FIG. 1). The aft frame strut 170 provides structural support for the turbofan 100. The structural support assembly 166 extends from an inner end of the aft frame strut 170 along the radial direction R.

The turbofan 100 further includes a cavity wall 172 surrounding at least a portion of the electric machine 146. More specifically, the cavity wall 172 substantially completely surrounds the electric machine 146, extending from a location proximate a forward end of the electric machine 146 to a location aft of the electric machine 146. The cavity wall 172 may function as, e.g., a cooling air cavity wall, a sump for cooling fluid, a protective cover for the electric machine 146, etc. For example, in certain embodiments, the engine may further include a second cavity wall (not shown) to form a buffer cavity surrounding the electric machine 146 and thermally protect the electric machine 146.

During certain operations of the turbofan 100, the LP rotor 124 rotates the rotor assembly 148 of the electric machine 146, allowing the electric machine 146 to generate electrical power. Thus, the electric machine 146 is operable in a generator mode. In some embodiments, in addition or alternatively to being operable in a generator mode, the electric machine 146 is operable in a drive mode during certain operations of the turbofan 100. In a drive mode, the rotor assembly 148 of the electric machine 146 drives the LP rotor 124. The electric machine 146 is electrically connected to an electric power bus 174. The electric power bus 174 is electrically connected to the electric machine 146 at a location inward of the core air flowpath 121 along the radial direction R. The electric power bus 174 may extend through the core air flowpath 121 (e.g., through the aft frame strut 170) and electrically connect the electric machine 146 to various other electrical sinks (accessory systems, electric/hybrid-electric propulsion devices, etc.), electrical sources (other electric machines, electric energy storage units, etc.), or both. Electrical power can be provided to the electric machine 146 via the electric power bus 174, e.g., when the electric machine 146 is operating in a drive mode, and electrical power generated by the electric machine 146 can be carried or transmitted to electrical systems via the electric power bus 174, e.g., when the electric machine 146 is operating in a generator mode.

Figure 3:
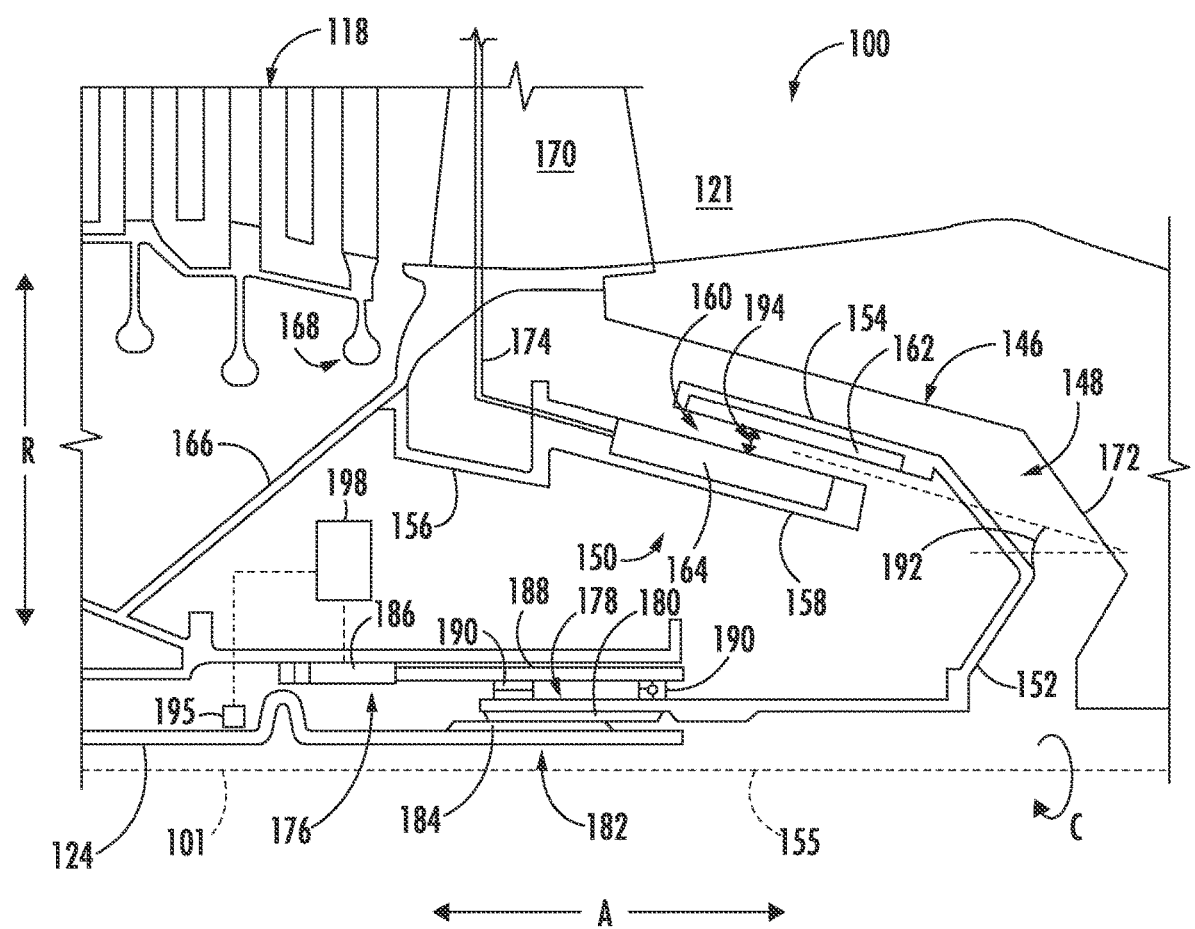
FIG. 3 provides a schematic, cross-sectional view of the electric machine of FIG. 2 and depicts the rotor assembly in a second position.

Referring now to FIGS. 2 and 3, FIG. 3 provides another close-up schematic view of the electric machine 146. For this embodiment, as will be appreciated by comparing the position of the rotor assembly 148 in FIG. 2 with the position of the rotor assembly 148 in FIG. 3, the rotor assembly 148 is movable relative to the stator assembly 150. Particularly, the electric machine 146 is movable between a first position, as shown in FIG. 2, and a second position, as shown in FIG. 3.

As depicted, the turbofan 100 includes an actuator 176. The actuator 176 can be operatively coupled to the rotor assembly 148, the stator assembly 150, or both for moving at least one of the rotor assembly 148 and the stator assembly 150. The actuator 176 can move at least one of the rotor assembly 148 and the stator assembly 150 along the centerline 155 of the electric machine 146 between the first position and the second position or to a position therebetween. For this embodiment, the actuator 176 is operatively coupled to the rotor assembly 148 for moving the rotor assembly 148 relative to the stator assembly 150 along the centerline 155 of the electric machine 146 between the first position and the second position. The rotor assembly 148 is positioned closer to the stator assembly 150 when in the first position than when in the second position.

As noted above, the rotor assembly 148 is coupled to the LP rotor 124 in this embodiment. The rotor assembly 148 includes the rotor 154 and the rotor connection member 152. The rotor connection member 152 extends between the LP rotor 124 and the rotor 154 for connecting the rotor 154 to the LP rotor 124. For the embodiment shown, the rotor connection member 152 is connected to the LP rotor 124 through a splined connection. More particularly, the rotor connection member 152 includes a connection portion 178 having a plurality of teeth 180 extending generally along the axial direction A, and similarly, the LP rotor 124 includes a connection portion 182 having a plurality of teeth 184 extending generally along the axial direction A. The plurality of teeth 180 of the connection portion 178 of the rotor connection member 152 are configured to engage with the plurality of teeth 184 of the connection portion 182 of the LP rotor 124, fixing the two components to one another along the circumferential direction C. Notably, such a configuration allows for relative movement of the rotor assembly 148 relative to the LP rotor 124 along the axial direction A.

In alternative embodiments, the rotor connection member 152 may be coupled to the LP rotor 124 in any other suitable manner that allows for relative movement along the axial direction A, while fixing the components along the circumferential direction C. For example, the rotor connection member 152 may be coupled to the LP rotor 124 using a plurality of linear bearings, linear slides, etc.

Further, for this embodiment, the actuator 176 is coupled to the rotor connection member 152 of the rotor assembly 148 for moving the rotor connection member 152 along the centerline 155 of the electric machine 146 relative to the LP rotor 124. In such a manner, the actuator 176 may move the rotor assembly 148 along the axial direction A, and along the centerline 155 of the electric machine 146, relative to the LP rotor 124.

For this embodiment, the actuator 176 is a linear actuator 176. The actuator 176 includes a base 186 and an extension portion 188 moveable relative to the base 186 along the axial direction A. The extension portion 188 is rotatably coupled to the rotor connection member 152, supported by a plurality of bearings 190, which are axial-load bearings in this embodiment. In such a manner, the rotor connection member 152 may rotate relative to the extension portion 188 along the circumferential direction C, but is fixed to the extension portion 188 along the axial direction A.

The actuator 176 can be a hydraulically powered actuator, a pneumatically powered actuator, an electrically powered actuator, a thermally activated actuator, a magnetic actuator, etc. Further, in alternative embodiments, the actuator 176 may not be a linear actuator but rather a scissor-actuator, a circular to linear actuator (such as a screw actuator), or any other actuator capable of creating or facilitating linear movement.

The actuator 176 is further coupled to the structural support assembly 166 of the turbine section, which as noted above, is part of the aft frame assembly 168 having the aft frame strut 170. In this regard, the actuator 176 is coupled to the same frame as the stator assembly 150. Notably, such a configuration may ensure the air gap 160 defined between the rotor 154 of the rotor assembly 148 and the stator 158 of the stator assembly 150 is maintained at a desired value or distance during operation of the turbofan 100. More specifically, as will be appreciated, as the turbofan 100 changes operating conditions, a temperature of various components may increase or decrease. For example, the LP rotor 124 may increase in temperature, which may cause the LP rotor 124 to increase in length along the axial direction A. The connection of the actuator 176 to the same frame as the stator assembly 150, along with the splined connection between the rotor connection member 152 and the LP rotor 124, may ensure that any increase or decrease in length of the LP rotor 124 does not appreciably affect a size of the air gap 160 defined between the rotor 154 and the stator 158.

Referring still to FIGS. 2 and 3, the first position is a closed or engaged position and the second position is an open or disengaged position. As used herein, the term "engaged position" refers to a relative positioning of the rotor 154 to the stator 158 in which the electric machine 146 is capable of operating within a reasonable margin of error of the design efficiency for the electric machine 146. For example, in the engaged position, the air gap 160 defined between the rotor 154 of the rotor assembly 148 and the stator 158 of the stator assembly 150 may be within a reasonable margin of an optimal design value, enabling a desired portion of magnetic flux from the magnets 162 of the rotor 154 to reach the stator 164. By contrast, as used herein, the term "disengaged position" refers to a relative positioning of the rotor 154 of the rotor assembly 148 to the stator 158 of the stator assembly 150 in which the electric machine 146 is not capable of operating with a reasonable efficiency (e.g., with an efficiency less than 10% of a maximum efficiency). It will be appreciated that the rotor assembly 148 can be moved relative to the stator assembly 150 between the first and second positions, and accordingly, the efficiency of the electric machine 146 corresponds generally to the position of the rotor assembly 148 relative to the stator assembly 150.

For this embodiment, the electric machine 146 is integrated into an interior position of the turbofan 100 (inward of a core air flowpath 121), wherein there may not be an excess amount of space. Accordingly, in order to facilitate movement of the rotor assembly 148 relative to the stator assembly 150 between the engaged position and the disengaged position or to a position therebetween, the air gap 160 defines an angle 192 relative to the centerline 155 of the electric machine 146 greater than 0 degrees and less than 90. More specifically, for the embodiment shown, the angle 192 defined by the air gap 160 relative to the centerline 155 of the electric machine 146 is greater than 10 degrees and less than 45 degrees, such as less than 30 degrees. Such a configuration may facilitate movement between the engaged position and the disengaged position without requiring an excess amount of movement of the rotor assembly 148 relative to the stator assembly 150 along the centerline 155 of the electric machine 146.

For example, a size of the air gap 160 (a distance 194 shown in FIG. 3) may be a first value when the rotor assembly 148 is in the engaged position relative to the stator assembly 150 and may be equal to a second value when the rotor assembly 148 is in the disengaged position relative to the stator assembly 150. In at least certain exemplary embodiments, the second value is at least two times larger than the first value, such as at least four times larger than the first value, such as at least five times larger than the first value, such as up to 200 times larger than the first value, such as up to 100 times larger than the first value, such as up to 20 times larger than the first value.

Further, given the angle 192 of the air gap 160 relative to the centerline 155, only relatively small movements of the rotor assembly 148 along the centerline 155 are necessary to increase or decrease the size of the air gap 160. For example, in embodiments, the actuator 176 may be configured to move the rotor 154 a distance along the centerline 155 relative to the stator assembly 150 between the engaged position and the disengaged position, with the distance being greater than 0.5 inches and less than 10 inches, such as greater than 1 inch and less than 5 inches.

An example manner in which the electric machine 146 can be used to control or mitigate undesirable vibrations of a rotating component, such as the LP rotor 124, will now be provided. Generally, actuation or movement of the stator assembly 150, the rotor assembly 148, or both relative to one another introduces the equivalent of a negative stiffness relationship between the stator 158 of the stator assembly 150 and the rotor 154 of the rotor assembly 148. Accordingly, actuation or movement of the stator assembly 150, the rotor assembly 148, or both provides a means to influence the level of applied negative stiffness on the LP rotor 124 and thus provides an ability to manipulate the dynamic behavior of the LP rotor 124 and/or the turbofan 100 generally. For instance, the actuation or movement of the stator assembly 150, the rotor assembly 148, or both can provide a means to control the modal response of the LP rotor 124.

Figure 4:
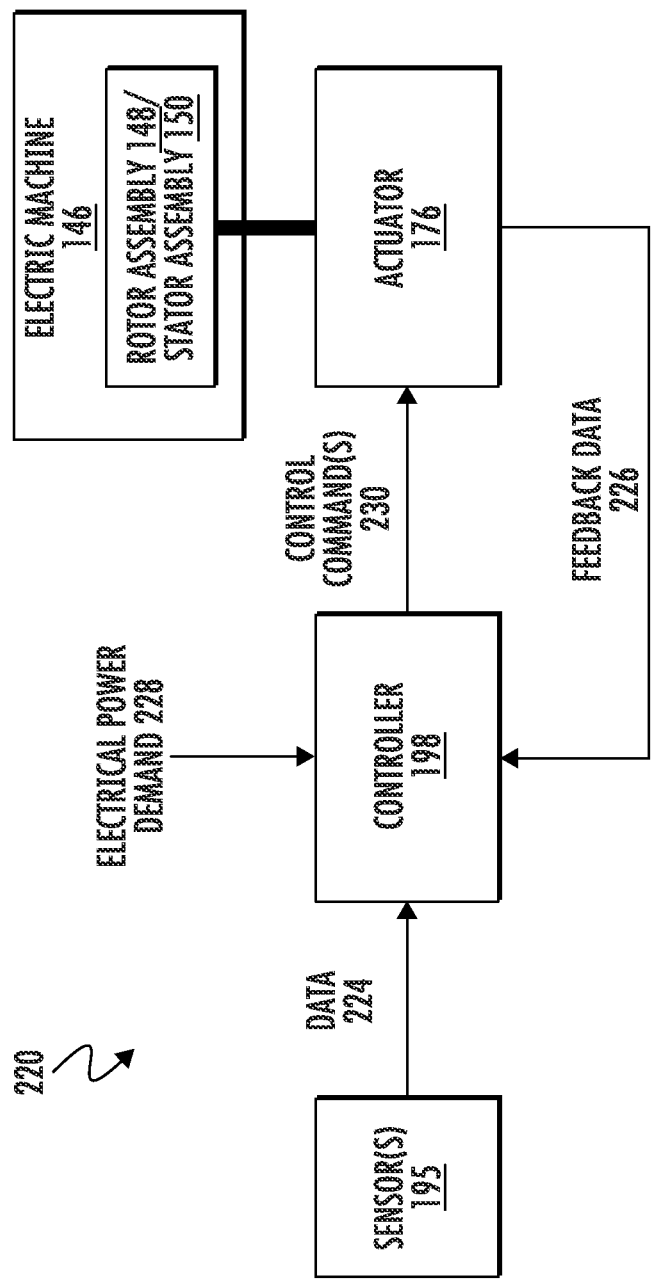
FIG. 4 provides a block diagram of an example control system for controlling the position of at least one of a rotor assembly and a stator assembly of an electric machine in accordance with an exemplary aspect of the present disclosure.

With reference now to FIGS. 2, 3, and 4, FIG. 4 provides a block diagram of an example control system 220 for controlling the position of at least one of the stator assembly 150 and the rotor assembly 148 to ultimately control or mitigate undesirable vibrations of the LP rotor 124 and/or the turbofan 100 generally. As shown, the control system 220 includes a controller 198, one or more sensors 195, and one or more controllable devices, which in this embodiment is the actuator 176. The controller 198 is communicatively coupled with the one or more sensors 195 and the actuator 176, e.g., via a suitable wired and/or wireless communication link.

The controller 198 includes one or more memory devices and one or more processors. The one or more memory devices can store information accessible by the one or more processors, including computer-executable instructions that can be executed by the one or more processors. The instructions can be any set of instructions that, when executed by the one or more processors, cause the one or more processors to perform operations, such as the operations provided herein. The controller 198 can be configured in accordance with the computing system 400 of FIG. 10. Although the controller 198 is depicted in FIGS. 2 and 3 at a location proximate to the electric machine 146, it will be appreciated that the controller 198 can be located at any suitable position within the turbofan 100, such as under a cowling. The controller 198 can also be positioned at a remote location with respect to the turbofan 100, e.g., within the fuselage of an aircraft to which the turbofan 100 is mounted. In some embodiments, the controller 198 can be a dedicated controller for controlling actuation of at least one of the stator assembly 150 and the rotor assembly 148. In other embodiments, the controller 198 can be an Electronic Engine Controller (EEC) of a Full Authority Digital Engine Control (FADEC) system.

For this embodiment, the one or more sensors 195 (denoted by a single sensor in FIGS. 2 and 3) include at least one sensor operable to sense or measure values for a parameter that indicates the operating state of the LP rotor 124. As one example, the sensor 195 can be a speed sensor operable to sense the rotational speed of the LP rotor 124. Accordingly, in such embodiments, the operating state of the LP rotor 124 is indicated by a speed of the LP rotor 124. As another example, the sensor 195 can be a temperature sensor operable to sense a temperature of the LP rotor 124. Accordingly, in such embodiments, the operating state of the LP rotor 124 is indicated by a temperature of the LP rotor 124. As yet another example, the sensor 195 can be a vibration sensor (e.g. accelerometer) operable to sense a vibration of the LP rotor 124. Accordingly, in such embodiments, the operating state of the LP rotor 124 is indicated by vibration of the LP rotor 124. It will be appreciated that the operating state of the LP rotor 124 can be indicated by other suitable parameters as well, including a combination of parameters. Moreover, the parameter values recorded for the parameter need not be directly associated with the LP rotor 124. For instance, a rotational speed of the HP rotor 122 (FIG. 1) can be used to indicate an operating state of the LP rotor 124, e.g., via known correlations. The sensor 195 can be located in any suitable location. As one example, as shown in FIGS. 2 and 3, the sensor 195 can be located proximate the LP rotor 124.

As shown best in FIG. 4, the controller 198 is configured to receive data 224 indicating an operating state of the LP rotor 124. For instance, the controller 198 can receive the data 224 from the sensor 195 or a plurality of sensors. As noted above, the operating state of the LP rotor 124 can be indicated by any number of suitable parameters, such as the rotational speed of the LP rotor 124. In addition, in some embodiments, the controller 198 is configured to receive feedback data 226 indicating a current position of the actuator 176 (e.g., a current axial position). In this manner, the current position of the actuator 176 can be correlated to the rotor assembly 148 relative to the stator assembly 150. The feedback data 226 can be received from the actuator 176 or one or more sensors associated with the actuator 176. Furthermore, in some embodiments, the controller 198 is configured to receive an electrical power demand 228. The electrical power demand 228 can indicate the electrical power demanded by one or more electrical loads electrically connected to the electric machine 146.

The controller 198 is further configured to generate a control command 230 based at least in part on the operating state of the LP rotor 124. The control command 230 can represent instructions to the actuator 176 for how the actuator 176 is to adjust its position, and consequently, how to adjust the position of at least one of the stator assembly 150 and the rotor assembly 148, if at all. In some instances, for example, the control command 230 can represent instructions indicating that the actuator 176 is to maintain its current position, which maintains the current position of the stator assembly 150 and/or the rotor assembly 148. In other instances, the control command 230 can represent instructions indicating that the actuator 176 is to move or actuate. In this manner, the current position of the stator assembly 150 and/or the rotor assembly 148 can be moved. As will be explained further below, the controller 198 can cause the actuator 176 to adjust the position of at least one of the stator assembly 150 and the rotor assembly 148 based at least in part on the determined control command 230.

In some embodiments, the controller 198 generates the control command 230 based on correlating the received values from the data 124 with preselected actuator positions using a schedule or lookup table. For instance, the value received as part of the data 224 that indicates the operating state of the LP rotor 124 can be correlated with a preselected position of the actuator 176. The controller 198 can store and access a schedule or lookup table that correlates parameter values with preselected positions of the actuator 176. The correlations can be determined by engineering analysis, e.g., during engine testing. The correlations can be made specific to an engine's vibration signature or generic correlations for a particular engine model can be used. For example, the correlations may be made based on a known fundamental frequency (primary modal resonance frequency) of the LP shaft or mid-shaft (shaft portion extending between LP shaft bearings, located to the left of the shaft 124 shown in FIG. 3). The controller 198 can generate a control command that represents instructions for controlling the actuator 176 to the preselected position correlated with the received value. In some embodiments, the controller 198 generates the control command 230 based at least in part on the operating state of the LP rotor 124 and the current position of the actuator 176 as provided in the received feedback data 226. For instance, after correlating the received value with the preselected position for the actuator 176, the current position of the actuator 176 can also be taken into consideration to ensure the actuator 176 is commanded to move to the preselected position from its current position.

In yet other embodiments, the controller 198 generates the control command 230 based at least in part on the operating state of the LP rotor 124, the current position of the actuator 176 as provided in the received feedback data 226, and the electrical power demand 228. For instance, in some embodiments, the electrical power demand 228 can be the primary factor or consideration in generation of the control command 230. As one example, if one or more electric motors that drive respective propulsors of an aerial vehicle are electrically coupled with the electric machine 146, and they require or demand full electrical power, it may not be feasible for safety purposes to move the rotor assembly 148 relative to the stator assembly 150 or vice versa even despite the undesirable modal vibrational response of the LP rotor 124 that may result without mitigating the undesirable response with the electric machine 146.

Accordingly, in such embodiments, the controller 198 generates the control command 230 based solely on the electrical power demand 228. For instance, if the electrical power demand 228 passes a demand threshold (e.g., exceeds the demand threshold), the controller 198 can generate a control command 230 for the actuator 176 that can cause the actuator 176 to turn off or cease the actuation functionality, and in some instances, can immediately cause the actuator 176 to move the rotor assembly 148 to the first position so that the electrical machine 146 can generate electrical power most efficiently. When the electrical power demand 228 decreases such that it passes the demand threshold once again (e.g., decreases below the demand threshold), actuation functionality can resume.

The controller 198 is further configured to cause the actuator 176 to adjust a position of at least one of the stator assembly 150 and the rotor assembly 148. Particularly, the controller 198 can generate and output the control command 230 as noted above. The control command 230 can be output by the controller 198 (e.g., as one or more electronic signals) and can be routed to the actuator 176. The actuator 176 can be controlled in accordance with the received control command 230. The controller 198 can cause the actuator 176 to adjust the position of at least one of the stator assembly 150 and the rotor assembly 148 based at least in part on the generated control command 230. As the control command 230 is generated based at least in part on the operating state of the LP rotor 124, it follows that the controller 198 causes the actuator 176 to adjust the position of at least one of the stator assembly 150 and the rotor assembly 148 based at least in part on the operating state of the LP rotor 124.

For the depicted embodiment of FIGS. 2 and 3, the controller 198 causes the actuator 176 to adjust the position of the rotor assembly 148 relative to the stator assembly 150. However, in alternative embodiments, the controller 198 can cause the actuator 176 to adjust the position of the stator assembly 150 relative to the rotor assembly 148. Notably, in causing the actuator 176 to adjust the position of at least one of the stator assembly 150 and the rotor assembly 148, the position of at least one of the stator assembly 150 and the rotor assembly 148 is adjusted such that the air gap 160 defined between the rotor assembly 148 and the stator assembly 150 is changed. The change in the air gap 160 or distance 194 between the rotor 154 and the stator 158 effectively changes the stiffness of the electric machine 196. As noted above, changing the stiffness of the electric machine 196 can be used to manipulate the modal response or dynamic behavior of the LP rotor 124.

In some example embodiments, the controller 198 can iteratively receive data, including data 224 indicating the operating state of the LP rotor 124, feedback data 226 indicating the current position of the actuator 176, and/or the electrical power demand 228, and based on the received data, the controller 198 can iteratively generate control commands 230. The control commands 230 can be output to the actuator 176 so that the actuator 176 either maintains its current position and thus the current position of the rotor assembly 148 relative to the stator assembly 150 or moves at least one of the rotor assembly 148 and the stator assembly 150 so that the air gap 160 therebetween is changed. In some embodiments, the controller 198 can continuously monitor and control the position of at least one of the rotor assembly 148 and the stator assembly 150 relative to one another during operation.

In other embodiments, particularly where the electrical machine 146 is operatively coupled with a rotating component of an aviation gas turbine engine mounted to an aircraft, the controller 198 can monitor and control the position of at least one of the rotor assembly 148 and the stator assembly 150 relative to one another during certain flight segments, e.g., during flight segments when high speed vibrations are likely to occur. In such embodiments, the controller 198 can turn off or cease operation of the actuation functionality during some flight segments. The controller 198 can automatically determine the flight segment in which the gas turbine engine is operating, e.g., based at least in part on received data indicating an altitude of the aircraft.

A specific example detailing one example manner in which the electric machine 146 can be used to mitigate the vibration response of the LP rotor 124 will now be provided. With reference now to FIGS. 2, 3, 4, and 5, FIG. 5 provides a graph depicting a vibration response of the LP rotor 124 at various applied stiffnesses as a function of a speed of the LP rotor 124. Particularly, the vibration response of the LP rotor 124 as a function of speed of the LP rotor 124 at a 0% stiffness magnitude is provided, the vibration response of the LP rotor 124 as a function of speed of the LP rotor 124 at a 25% stiffness magnitude is provided, the vibration response of the LP rotor 124 as a function of speed of the LP rotor 124 at a 50% stiffness magnitude is provided, the vibration response of the LP rotor 124 as a function of speed of the LP rotor 124 at a 75% stiffness magnitude is provided, and the vibration response of the LP rotor 124 as a function of speed of the LP rotor 124 at a 100% stiffness magnitude is provided. The vibration response of the LP rotor 124 at the applied stiffnesses as a function of a speed of the LP rotor 124 can be obtained in any suitable manner, e.g., by testing the engine before introduced into the field or during a service visit.

As depicted, generally, the modal or vibration response of the LP rotor 124 is such that applying the 0% stiffness magnitude from idle speed to approximately 2,600 Revolutions Per Minute (RPM) provides the lowest vibration response. However, for speeds above 2,600 RPM, applying the 100% stiffness magnitude provides the lowest vibration response. Accordingly, the controller 198 can control the actuator 176 to position the rotor assembly 148 relative to the stator assembly 150 in the following example manner.

Figure 5:
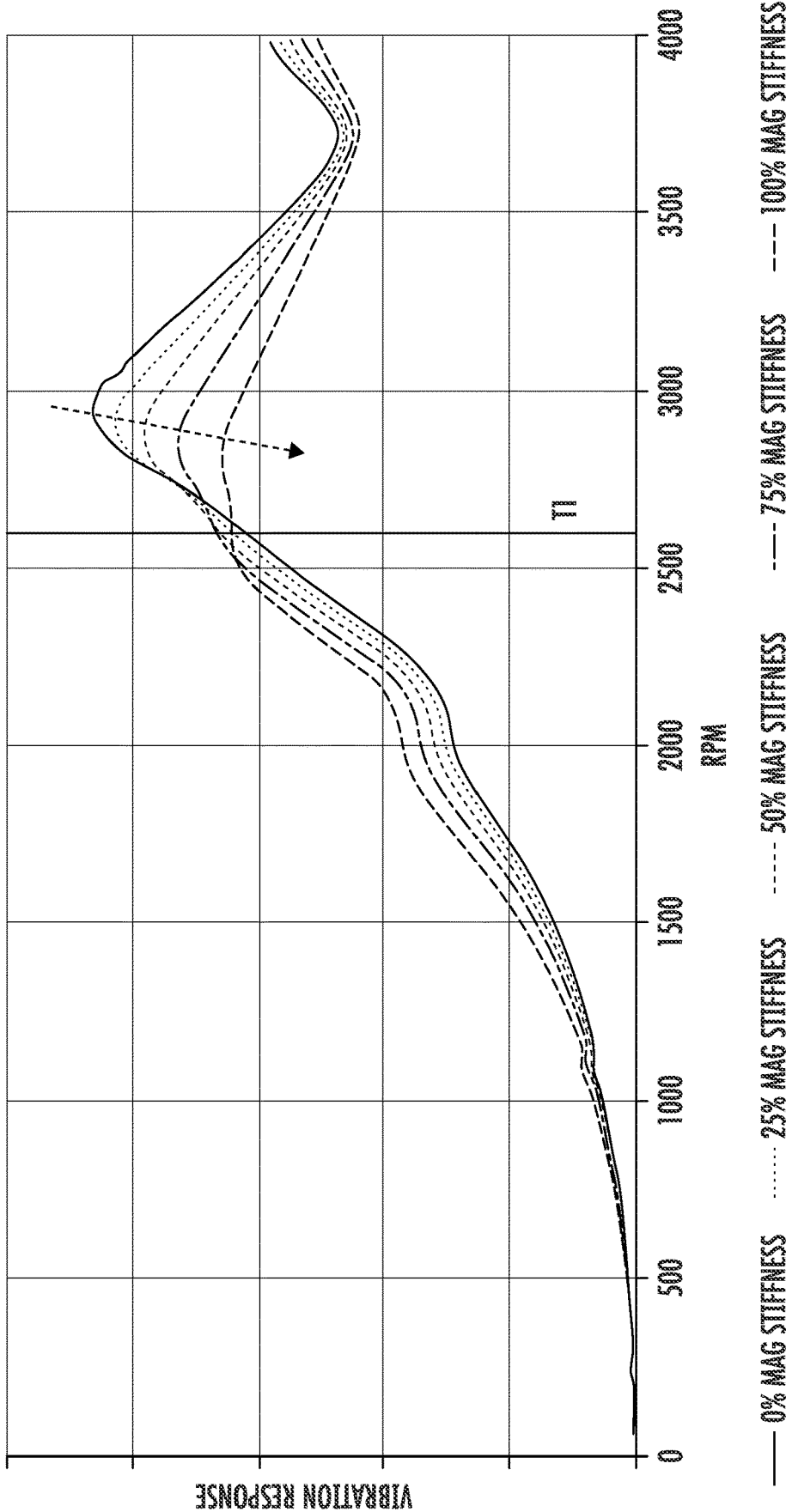
FIG. 5 provides a graph depicting a vibration response of a rotating component of a gas turbine engine at various stiffnesses applied by an electric machine as a function of a speed of the rotating component in accordance with an exemplary aspect of the present disclosure.

Upon an engine start and from idle speed to approximately 2,600 RPM, the controller 198 can cause the actuator 176 to move and/or maintain the rotor assembly 148 in the disengaged or second position, e.g., as shown in FIG. 3. The controller 198 can iteratively receive data 224 indicating the operating state of the LP rotor 124. Each received set of data 224 can include a parameter value for a parameter that indicates the operating state of LP rotor 124. The controller 198 can determine whether the parameter value indicating the operating state of the LP rotor 124 passes a threshold. For instance, where the parameter value is a rotational speed of the LP rotor 124, the controller 198 can determine whether the speed of the LP rotor 124 passes a threshold. For this embodiment, a threshold T1 is set at approximately 2,600 RPM as shown in FIG. 5. As used herein, passing a threshold means that the parameter value exceeds or is greater than the threshold where the parameter values are generally increasing prior to reaching the threshold or that the parameter value is less than the threshold where the parameter values are generally decreasing prior to reaching the threshold.

On one hand, when the speed of the LP rotor 124 does not pass the threshold T1, the controller 198 can control the actuator 176 to maintain its current position so that the rotor assembly 148 is maintained in the disengaged or second position. In this manner, the electric machine 146 applies the 0% stiffness magnitude to the LP rotor 124, and consequently, the LP rotor 124 experiences the lowest vibration possible in this example. On the other hand, when the speed of the LP rotor 124 passes the threshold T1, the controller 198 can control the actuator 176 to adjust the position of the rotor assembly 148 relative to the stator assembly 150. That is, the controller 198 can generate and output a control command 230 that provides instructions to the actuator 176 to adjust the rotor assembly 148 from the disengaged or second position depicted in FIG. 3 to a position toward the engaged or first position depicted in FIG. 2. Accordingly, the distance 194 of the air gap 160 is decreased and consequently more electrical power is generated by the electric machine 146. As a result, the stiffness magnitude applied on the LP rotor 124 by the electric machine 146 is increased. This change in applied stiffness can advantageously change the modal response of the LP rotor 124, such as the modal frequency and mode shape of the LP rotor 124.

In some embodiments, when the speed of the LP rotor 124 passes the threshold T1, the controller 198 can control the actuator 176 to adjust the position of the rotor assembly 148 from the second position depicted in FIG. 3 directly to the first position depicted in FIG. 2. In this manner, the stiffness applied to the LP rotor 124 by the electric machine 146 can go from the 0% stiffness magnitude to the 100% stiffness magnitude. Accordingly, for this embodiment, the lowest possible vibration response for the LP rotor 124 can be achieved for the depicted engine speed range.

In other embodiments, when the speed of the LP rotor 124 passes the threshold T1, the controller 198 can control the actuator 176 to adjust the position of the rotor assembly 148 from the second position depicted in FIG. 3 to a first intermediate position between the first and second positions. This first intermediate position can be maintained until the engine speed passes a second threshold. When the speed of the LP rotor 124 passes the second threshold, the controller 198 can control the actuator 176 to adjust the position of the rotor assembly 148 from the first intermediate position to a second intermediate position between the first and second positions that is closer to the first position than the first intermediate position, or alternatively, the position of the rotor assembly 148 can be adjusted from the first intermediate position to the first position. Any number of iterations can be implemented to control the vibration response of the LP rotor 124 in accordance with its known vibration signature.

In yet other embodiments, when the speed of the LP rotor 124 passes the threshold T1, the controller 198 can control the actuator 176 to adjust the position of the rotor assembly 148 relative to the stator assembly 150 in a gradual manner from one position to another, e.g., from the second position to the first position, from the first position to the second position, from an intermediate position to one of the first position and the second position, from one of the first position and the second position to an intermediate position, etc.

Although FIG. 5 shows a single threshold, it will be appreciated that a plurality of thresholds or triggers can be set at different speeds according to a threshold schedule such that when a given threshold is passed, the controller 198 can control the actuator 176 to adjust the position of the rotor assembly 148 relative to the stator assembly 150. In some instances, when the speed of the LP rotor 124 passes a given threshold, the controller 198 can cause the actuator 176 to adjust the position of the rotor assembly 148 relative to the stator assembly 150 such that the stator assembly 150 and the rotor assembly 148 are positioned closer to one another, or stated another way, such that the rotor assembly 148 is moved closer toward the first position. In other instances, when the speed of the LP rotor 124 passes a given threshold, the controller 198 can cause the actuator 176 to adjust the position of the rotor assembly 148 relative to the stator assembly 150 such that the stator assembly 150 and the rotor assembly 148 are positioned further away from one another, or stated another way, such that the rotor assembly 148 is moved closer toward the second position.

It will further be appreciated that the exemplary turbofan 100 having the embedded electric machine 146 depicted in FIGS. 1, 2, and 3 is provided by way of example only. In other exemplary embodiments, the electric machine 146 and gas turbine engine may have any other suitable configuration. For example, in other exemplary embodiments, the electric machine may be positioned in any other suitable location within the gas turbine engine. The control system 220 provided in FIG. 4 and described in the accompanying text can control the modal response of a rotating component having an electric machine operatively coupled thereto for other suitable electric machine and gas turbine engine configurations.

Figure 6:
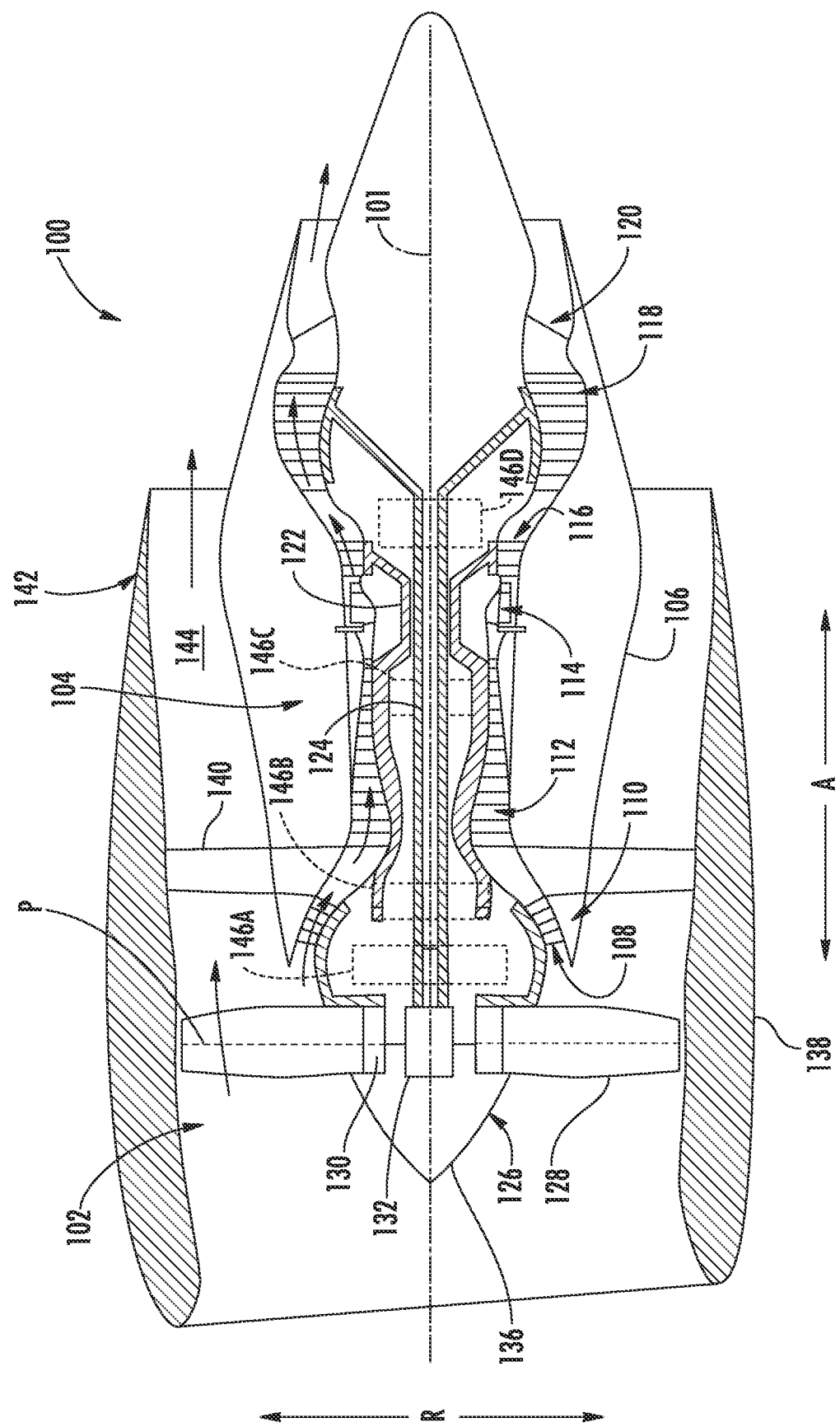
FIG. 6 provides a schematic, cross-sectional view of a gas turbine engine in accordance with another exemplary embodiment of the present disclosure.

For instance, FIG. 6 provides a schematic, cross-sectional view of a gas turbine engine configured in a manner similar to the exemplary turbofan of FIG. 1. As indicated by the phantom lines, the exemplary gas turbine engine 100 of FIG. 6 may include an electric machine 146 at various other suitable locations. For example, the gas turbine engine 100 can include a first electric machine 146A coupled to the LP rotor 124 at a location forward of the LP compressor 110. Additionally or alternatively, the gas turbine engine 100 can include a second electric machine 146B coupled to the LP rotor 124, the HP rotor 122, or both within the compressor section at a location forward of the HP compressor 112. Additionally or alternatively, the gas turbine engine 100 can include a third electric machine 146C coupled to the LP rotor 124, the HP rotor 122, or both within the compressor section at a location inward of the HP compressor 212. Additionally or alternatively, the gas turbine engine 100 can include a fourth electric machine 146D coupled with the LP rotor 124 within the turbine section at a location forward of the LP turbine 218. In yet other embodiments, an electric machine 146 can be embedded in other suitable locations in accordance with one or more exemplary embodiments of the present disclosure.

Figure 7:
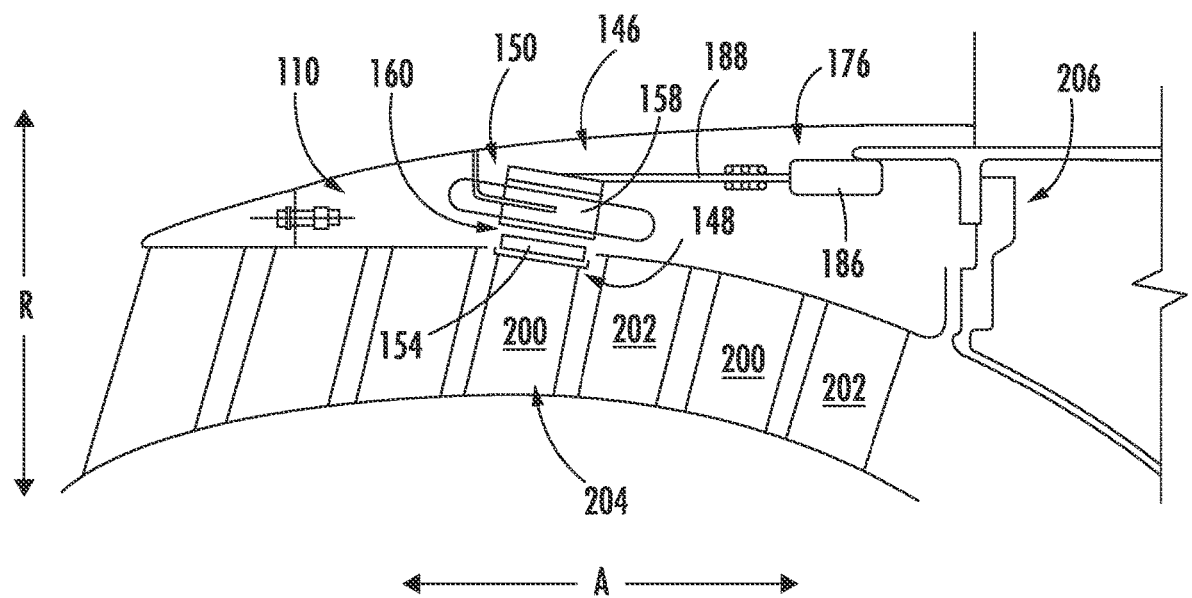
FIG. 7 provides a schematic, cross-sectional view of an electric machine embedded in a gas turbine engine in accordance with another exemplary embodiment of the present disclosure in a first position.
Figure 8:
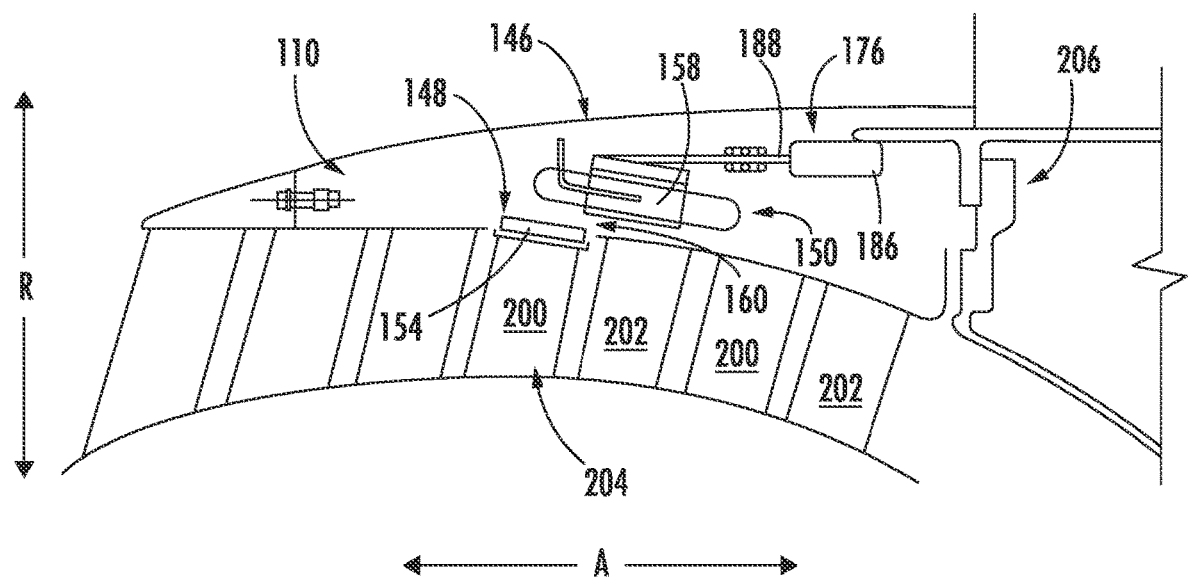
FIG. 8 provides a schematic, cross-sectional view of the exemplary electric machine of FIG. 7 embedded in a gas turbine engine in a second position.

For example, referring now to FIGS. 7 and 8, close-up, schematic, cross-sectional views are provided of an LP compressor 110, or booster compressor, of a gas turbine engine having an electric machine 146 embedded therein. FIG. 7 provides a view of the exemplary electric machine 146 in a first position, and FIG. 8 provides a view of the exemplary electric machine 146 in a second position.

The LP compressor 110 of the gas turbine engine depicted generally includes a plurality of LP compressor rotor blades 200 and a plurality of LP compressor stator vanes 202. The plurality of LP compressor rotor blades 200 includes a plurality of stages 204 of LP compressor rotor blades 200 spaced along an axial direction A of the gas turbine engine. The gas turbine engine further includes a frame assembly 206, which may be a compressor forward frame. For this embodiment, the LP compressor stator vanes 202 are coupled to the frame assembly 206.

Further, the exemplary gas turbine engine includes an electric machine 146 configured in accordance with an exemplary embodiment of the present disclosure. Accordingly, the electric machine 146 generally includes a stator assembly 150 and a rotor assembly 148 rotatable about a centerline 155 (not depicted in FIGS. 7 and 8; the centerline 155 aligned with an engine centerline) relative to the stator assembly 150. The rotor assembly 148 includes a rotor 154 and the stator assembly 150 includes a stator 158, with the rotor 154 and the stator 158 defining an air gap 160 therebetween. Moreover, an actuator 176 is operatively coupled to the rotor assembly 148, the stator assembly 150, or both for moving the rotor assembly 148 or the stator assembly 150 relative to the other of the rotor assembly 148 or the stator assembly 150 along the centerline 155 between the first position and the second position.

Specifically, for the exemplary embodiment of FIGS. 7 and 8, the actuator 176 is operatively coupled to the stator assembly 150 for moving the stator assembly 150 relative to the rotor assembly 148 along the centerline 155 between the first position and the second position. As with the embodiment above, the first position is an engaged position, as depicted in FIG. 7, and the second position is a disengaged position, as is depicted in FIG. 8. As will be appreciated, the rotor assembly 148 is positioned closer to the stator assembly 150 when in the engaged position as compared to when in the disengaged position.

Further for the exemplary embodiment of FIGS. 7 and 8, the rotor assembly 148 is not coupled to an LP rotor 124 of the engine, and instead is coupled to a plurality of rotor blades of the gas turbine engine at a location outward of the plurality rotor blades of the gas turbine engine along a radial direction R of the gas turbine engine. More specifically, for the embodiment depicted, the plurality of rotor blades is a plurality of LP compressor rotor blades 200 in a stage 204 of LP compressor blades 200.

It will be appreciated that in still other exemplary embodiments, the gas turbine engine, electric machine 146, or both may have still other suitable configurations. Further, although the exemplary electric machine 146 described herein is depicted within and described herein as being embedded within a gas turbine engine, in other exemplary embodiments, the exemplary electric machine 146 may be utilized with any other suitable machine having at least one rotating component.

Figure 9:
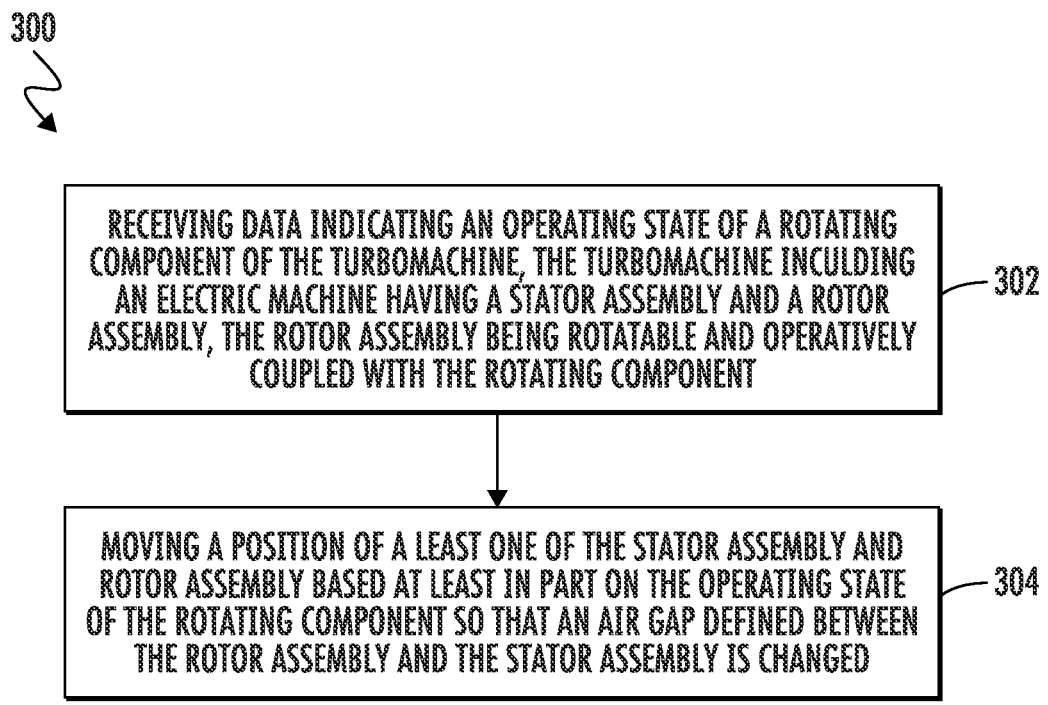
FIG. 9 provides a flow diagram for a method of operating a gas turbine engine having an embedded electric machine in accordance with an exemplary aspect of the present disclosure.

Referring now to FIG. 9, a flow diagram for a method (300) of operating a turbomachine in accordance with an exemplary aspect of the present disclosure is depicted. In certain exemplary aspects, the method (300) may utilize one or more of the exemplary electric machines described above with reference to FIGS. 1-3 and 6-8. Accordingly, in certain exemplary aspects the electric machine may include a stator assembly and a rotor assembly, and may define a centerline. Furthermore, the control system 220 of FIG. 4 may be used to implement certain aspects of the method (300). The turbomachine can be any suitable turbomachine, such as any of the turbomachines described herein.

At (302), the method (300) includes receiving data indicating an operating state of a rotating component of the turbomachine, the turbomachine including an electric machine having a stator assembly and a rotor assembly, the rotor assembly being rotatable and operatively coupled with the rotating component. For instance, the turbomachine can be operated such that the rotating assembly rotates about an axis of rotation and so that the rotor assembly of the electric machine rotates along with the rotating component about its axis of rotation or centerline. The rotating assembly can be a rotor of the turbomachine, for example. The electric machine can be configured in accordance with the example embodiments provided herein.

The data can be received by a controller from a sensor operable to sense or measure values for a parameter that indicates the operating state of the rotating component. As one example, the sensor can be a speed sensor operable to sense the rotational speed of the rotating component. Accordingly, in such implementations, the operating state of the rotating component is indicated by a speed of the rotating component. As another example, the sensor can be a temperature sensor operable to sense a temperature of the rotating component. Accordingly, in such implementations, the operating state of the rotating component is indicated by a temperature of the rotating component. As yet another example, the sensor can be a vibration sensor operable to sense the vibration of the rotating component. Accordingly, in such implementations, the operating state of the rotating component is indicated by vibration of the rotating component. It will be appreciated that the operating state of the rotating component can be indicated by other suitable parameters as well, including a combination of parameters.

Further, in some implementations, in addition to the data indicating the operating state of the rotating component, the controller can receive feedback data indicating a current position of the actuator and/or an electrical power demanded by one or more electrical loads electrically coupled with the electric machine. As will be explained below, such data can be used in generation of a control command.

At (304), the method (300) includes moving a position of at least one of the stator assembly and the rotor assembly based at least in part on the operating state of the rotating component so that an air gap defined between the rotor assembly and the stator assembly is changed. For instance, the controller can receive the data indicating the operating state of the rotating component of the turbomachine and can generate a control command that provides instructions for an actuator to adjust the position of at least one of the stator assembly and the rotor assembly. The control command can be generated based at least in part on the operating state of the rotating component. As one example, the operating state can be indicated by a rotational speed of the rotating component, and accordingly, the control command generated can be based on the sensed or calculated rotational speed. The position of at least one of the stator assembly and the rotor assembly is moved based at least in part on the control command.

In some implementations, the control command can additionally be generated based at least in part on feedback data provided by the actuator. The feedback data can indicate a current position of the actuator. In some further implementations, the control command can be generated based at least in part on the electrical power demanded by one or more electrical loads electrically connected to the electric machine. For instance, if an electric motor that drives a propulsor of an aerial vehicle is electrically coupled with the electric machine and demands full electrical power, it may not be feasible for safety purposes to move the rotor assembly relative to the stator assembly or vice versa even despite the undesirable modal vibrational response that will result without mitigating the response by actuating at least one of the stator assembly and the rotor assembly relative to one another.

Further, in some implementations, moving the position of at least one of the stator assembly and the rotor assembly includes moving the position of the rotor assembly relative to the stator assembly, e.g., as provided in the embodiment of FIGS. 2 and 3. In other implementations, moving the position of at least one of the stator assembly and the rotor assembly includes moving the position of the stator assembly relative to the rotor assembly, e.g., as provided in the embodiment of FIGS. 7 and 8.

Notably, as stated above, moving the position of at least one of the stator assembly and the rotor assembly, the position of at least one of the stator assembly and the rotor assembly is adjusted such that the air gap defined between the rotor assembly and the stator assembly is changed. The change in the air gap or distance between the rotor of the rotor assembly and the stator of the stator assembly effectively changes the stiffness of the electric machine. Changing the stiffness of the electric machine can be used to manipulate the modal response or dynamic behavior of the rotating component.

In some implementations, the air gap defines an angle relative to the centerline greater than zero degrees and less than 90 degrees, e.g., as shown in FIGS. 2 and 3. Accordingly, in such implementations, moving the rotor assembly relative to the stator assembly or vice versa along the centerline of the electric machine at (304) includes moving the rotor assembly relative to the stator assembly (or vice versa) along the centerline of the electric machine at least 0.5 inches and less than 10 inches. The inclination of the air gap allows the rotor assembly or stator assembly to be moved a relatively short distance while still obtaining a desired separation between the rotor assembly and stator assembly.

Figure 10:
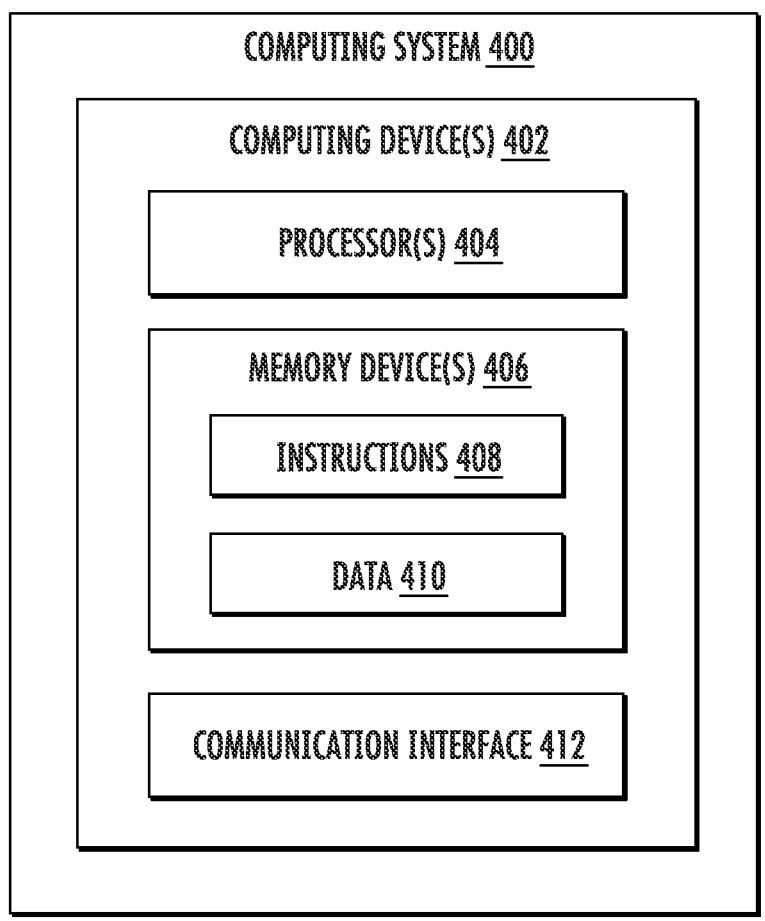
FIG. 10 is a block diagram of an example computing system that can be used to implement aspects of the present disclosure.

FIG. 10 provides a block diagram of the computing system 400 in accordance with exemplary aspects of the present disclosure. The computing system 400 is one example of a suitable computing system for implementing certain aspects of the present disclosure.

As shown in FIG. 10, the computing system 400 can include one or more processor(s) 404 and one or more memory device(s) 406. The one or more processor(s) 404 and one or more memory device(s) 406 can be embodied in one or more computing device(s) 402, such as the controller 198 provided herein. The one or more processor(s) 404 can include any suitable processing device, such as a microprocessor, microcontroller, integrated circuit, logic device, or other suitable processing device. The one or more memory device(s) 406 can include one or more computer-readable medium, including, but not limited to, non-transitory computer-readable medium or media, RAM, ROM, hard drives, flash drives, and other memory devices, such as one or more buffer devices.

The one or more memory device(s) 406 can store information accessible by the one or more processor(s) 404, including computer-readable instructions 408 that can be executed by the one or more processor(s) 404. The instructions 408 can be any set of instructions that, when executed by the one or more processor(s) 404, cause the one or more processor(s) 404 to perform operations. The instructions 408 can be software written in any suitable programming language or can be implemented in hardware. The instructions 408 can be any of the computer-readable instructions noted herein.

The memory device(s) 406 can further store data 410 that can be accessed by the processor(s) 404. For example, the data 410 can include received data 224, feedback data 226, and other data (FIG. 4). Further, the data 410 can include one or more table(s), function(s), algorithm(s), model(s), equation(s), etc. according to example embodiments of the present disclosure.

The one or more computing device(s) 402 can also include a communication interface 412 used to communicate, for example, with other components of the control system 220 (FIG. 4) or other systems or devices. The communication interface 412 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Additional exemplary aspects will be described below with respect to the following clauses:

1. A turbomachine, comprising: a rotating component rotatable about an axis of rotation; an electric machine, comprising: a stator assembly; a rotor assembly rotatable with the rotating component relative to the stator assembly; an actuator operatively coupled with at least one of the rotor assembly and the stator assembly for moving the rotor assembly, the stator assembly, or both relative to one another; and a controller communicatively coupled with the actuator, the controller being configured to: receive data indicating an operating state of the rotating component; and cause the actuator to adjust a position of at least one of the stator assembly and the rotor assembly based at least in part on the operating state of the rotating component.

2. The turbomachine of any preceding clause, wherein in causing the actuator to adjust the position of at least one of the stator assembly and the rotor assembly, the position of at least one of the stator assembly and the rotor assembly is moved such that an air gap defined between the rotor assembly and the stator assembly is changed.

3. The turbomachine of any preceding clause, wherein the operating state of the rotating component is indicated by a speed of the rotating component.

4. The turbomachine of any preceding clause, wherein the controller is further configured to: determine whether a parameter value received as part of the data has passed a threshold, and wherein when the parameter value has passed the threshold, the controller is configured to cause the actuator to adjust the position of at least one of the stator assembly and the rotor assembly.

5. The turbomachine of any preceding clause, wherein when the parameter value has passed the threshold, the controller is configured to cause the actuator to adjust the position of at least one of the stator assembly and the rotor assembly such that the stator assembly and the rotor assembly are positioned closer to one another.

6. The turbomachine of any preceding clause, wherein when the parameter value has passed the threshold, the controller is configured to cause the actuator to adjust the position of at least one of the stator assembly and the rotor assembly such that the stator assembly and the rotor assembly are positioned further away from one another.

7. The turbomachine of any preceding clause, wherein the rotor assembly and the stator assembly together define an air gap, and wherein the air gap defines an angle relative to a centerline defined by the electric machine that is greater than zero degrees and less than 90 degrees.

8. The turbomachine of any preceding clause, wherein the angle defined by the air gap relative to the centerline is greater than 10 degrees and less than 45 degrees.

9. The turbomachine of any preceding clause, wherein the controller causes the actuator to adjust the position of the rotor assembly relative to the stator assembly.

10. The turbomachine of any preceding clause, wherein the controller causes the actuator to adjust the position of the stator assembly relative to the rotor assembly.

11. The turbomachine of any preceding clause, wherein the turbomachine is a core engine of an aviation gas turbine engine and the rotating component is one of a high pressure rotor and a low pressure rotor of the core engine.

12. The turbomachine of any preceding clause, wherein the controller is further configured to: generate a control command that indicates instructions for the actuator to adjust the position of at least one of the stator assembly and the rotor assembly based at least in part on the operating state of the rotating component, and wherein the position of at least one of the stator assembly and the rotor assembly is adjusted based at least in part on the control command.

13. The turbomachine of any preceding clause, wherein the controller is further configured to: receive feedback data indicating a current position of the actuator, and wherein the control command is generated based at least in part on the feedback data.

14. The turbomachine of any preceding clause, wherein the controller is further configured to: receive an electrical power demand that indicates electrical power demanded by one or more electrical loads electrically coupled with the electric machine, and wherein the control command is generated based at least in part on the electrical power demand.

15. The turbomachine of any preceding clause, wherein the controller is further configured to: determine whether the electrical power demand passes a demand threshold, and wherein when the electrical power demand passes the demand threshold, the controller causes the actuator to adjust the position of at least one of the stator assembly and the rotor assembly so that an air gap between the rotor assembly and the stator assembly is decreased.

16. A method of operating a turbomachine, the method comprising: receiving data indicating an operating state of a rotating component of the turbomachine, the turbomachine including an electric machine having a stator assembly and a rotor assembly, the rotor assembly being rotatable and operatively coupled with the rotating component; and moving a position of at least one of the stator assembly and the rotor assembly based at least in part on the operating state of the rotating component so that an air gap defined between the rotor assembly and the stator assembly is changed.

17. The method of any preceding clause, further comprising: receiving feedback data indicating a current position of an actuator operatively coupled with at least one of the stator assembly and the rotor assembly; receiving an electrical power demand that indicates electrical power demanded by one or more electrical loads electrically coupled with the electric machine; and generating a control command that indicates instructions for the actuator to move the position of at least one of the stator assembly and the rotor assembly based at least in part on the operating state of the rotating component, the current position of the actuator, and the electrical power demand, and wherein the position of at least one of the stator assembly and the rotor assembly is moved based at least in part on the control command.

18. The method of any preceding clause, wherein the moving comprises moving the position of the rotor assembly relative to the stator assembly.

19. The method of any preceding clause, wherein the moving comprises moving the position of the stator assembly relative to the rotor assembly.

20. A non-transitory computer readable medium comprising computer-executable instructions, which, when executed by one or more processors of a controller, cause the one or more processors to: receive data indicating an operating state of a rotating component of a turbomachine, the turbomachine including an electric machine having a stator assembly and a rotor assembly, the rotor assembly being rotatable and operatively coupled with the rotating component; generate a control command for an actuator to adjust a position of at least one of the stator assembly and the rotor assembly based at least in part on the operating state of the rotating component; and cause the actuator to adjust the position of at least one of the stator assembly and the rotor assembly based at least in part on the control command.

What is claimed is:

1. A turbomachine, comprising:
a rotating component rotatable about an axis of rotation;
an electric machine, comprising:
   a stator assembly;
   a rotor assembly rotatable with the rotating component relative to the stator assembly;
an actuator operatively coupled with at least one of the rotor assembly and the stator assembly for moving the rotor assembly, the stator assembly, or both relative to one another; and
a controller communicatively coupled with the actuator, the controller being configured to:
   receive data indicating an operating state of the rotating component; and
   cause the actuator to adjust a position of at least one of the stator assembly and the rotor assembly based at least in part on the operating state of the rotating component;
wherein the controller is further configured to:
   determine whether a parameter value received as part of the data has passed a threshold, and
   wherein when the parameter value has passed the threshold, the controller is configured to cause the actuator to adjust the position of the at least one of the stator assembly and the rotor assembly to control a vibration response of the rotating component to which the electric machine is coupled and to change a stiffness of the electric machine, and
   wherein in causing the actuator to adjust the position of the at least one of the stator assembly and the rotor assembly, the position of the at least one of the stator assembly and the rotor assembly is moved such that an air gap defined between the rotor assembly and the stator assembly is changed and the stiffness of the electric machine is changed.

2. The turbomachine of claim 1, wherein the air gap is tapered, and wherein in causing the stiffness of the electric machine to be changed, a modal response of the rotor assembly is controlled.

3. The turbomachine of claim 1, wherein the operating state of the rotating component is indicated by a speed of the rotating component, and wherein when the air gap defined between the rotor assembly and the stator assembly is decreased, a stiffness magnitude applied on the rotor assembly by the electric machine is increased.

4. The turbomachine of claim 1, wherein when the parameter value has passed the threshold, the controller is configured to cause the actuator to adjust the position of the at least one of the stator assembly and the rotor assembly such that the stator assembly and the rotor assembly are positioned closer to one another.

5. The turbomachine of claim 1, wherein when the parameter value has passed the threshold, the controller is configured to cause the actuator to adjust the position of the at least one of the stator assembly and the rotor assembly such that the stator assembly and the rotor assembly are positioned further away from one another.

6. The turbomachine of claim 1, wherein the rotor assembly and the stator assembly together define the air gap, and wherein the air gap defines an angle relative to a centerline defined by the electric machine that is greater than zero degrees and less than 90 degrees.

7. The turbomachine of claim 6, wherein the angle defined by the air gap relative to the centerline is greater than 10 degrees and less than 45 degrees.

8. The turbomachine of claim 1, wherein the controller causes the actuator to adjust the position of the rotor assembly relative to the stator assembly.

9. The turbomachine of claim 1, wherein the controller causes the actuator to adjust the position of the stator assembly relative to the rotor assembly.

10. The turbomachine of claim 1, wherein the turbomachine is a core engine of an aviation gas turbine engine and the rotating component is one of a high pressure rotor and a low pressure rotor of the core engine.

11. The turbomachine of claim 1, wherein the controller is further configured to:
   generate a control command that indicates instructions for the actuator to adjust the position of the at least one of the stator assembly and the rotor assembly based at least in part on the operating state of the rotating component, and
   wherein the position of the at least one of the stator assembly and the rotor assembly is adjusted based at least in part on the control command.

12. The turbomachine of claim 11, wherein the controller is further configured to:
   receive feedback data indicating a current position of the actuator, and
   wherein the control command is generated based at least in part on the feedback data.

13. The turbomachine of claim 11, wherein the controller is further configured to:

receive an electrical power demand that indicates electrical power demanded by one or more electrical loads electrically coupled with the electric machine, and wherein the control command is generated based at least in part on the electrical power demand.

14. The turbomachine of claim 13, wherein the controller is further configured to:

determine whether the electrical power demand passes a demand threshold, and wherein when the electrical power demand passes the demand threshold, the controller causes the actuator to adjust the position of the at least one of the stator assembly and the rotor assembly so that the air gap between the rotor assembly and the stator assembly is decreased.

15. A method of operating a turbomachine, the method comprising:

receiving data indicating an operating state of a rotating component of the turbomachine, the turbomachine including an electric machine having a stator assembly and a rotor assembly, the rotor assembly being rotatable and operatively coupled with the rotating component;

moving a position of at least one of the stator assembly and the rotor assembly based at least in part on the operating state of the rotating component so that an air gap defined between the rotor assembly and the stator assembly is changed and a stiffness of the electric machine is changed; and determining whether a parameter value received as part of the data has passed a threshold, and wherein when the parameter value has passed the threshold, adjusting the position of the at least one of the stator assembly and the rotor assembly to control a vibration response of the rotating component to which the electric machine is coupled and to change the stiffness of the electric machine.

16. The method of claim 15, further comprising:

receiving feedback data indicating a current position of an actuator operatively coupled with the at least one of the stator assembly and the rotor assembly;

receiving an electrical power demand that indicates electrical power demanded by one or more electrical loads electrically coupled with the electric machine; and generating a control command that indicates instructions for the actuator to move the position of the at least one of the stator assembly and the rotor assembly based on the operating state of the rotating component, the current position of the actuator, and the electrical power demand, and wherein the position of the at least one of the stator assembly and the rotor assembly is moved based at least in part on the control command, wherein in causing the stiffness of the electric machine to be changed, a modal response of the rotor assembly is controlled, and wherein when the air gap defined between the rotor assembly and the stator assembly is decreased, a stiffness magnitude applied on the rotor assembly by the electric machine is increased.

17. The method of claim 15, wherein the moving comprises moving the position of the rotor assembly relative to the stator assembly.

18. The method of claim 15, wherein the moving comprises moving the position of the stator assembly relative to the rotor assembly.

19. A non-transitory computer readable medium comprising computer-executable instructions, which, when executed by one or more processors of a controller, cause the one or more processors to:

receive data indicating an operating state of a rotating component of a turbomachine, the turbomachine including an electric machine having a stator assembly and a rotor assembly, the rotor assembly being rotatable and operatively coupled with the rotating component;

generate a control command for an actuator to adjust a position of at least one of the stator assembly and the rotor assembly based at least in part on the operating state of the rotating component;

cause the actuator to adjust the position of the at least one of the stator assembly and the rotor assembly based at least in part on the control command; and determine whether a parameter value received as part of the data has passed a threshold, and wherein when the parameter value has passed the threshold, cause the actuator to adjust the position of the at least one of the stator assembly and the rotor assembly to control a vibration response of the rotating component to which the electric machine is coupled and to change a stiffness of the electric machine.

\* \* \* \* \*